Patented Nov. 4, 1941

2,261,704

UNITED STATES PATENT OFFICE 2,261,704

PROCESS FOR PRODUCING ACROLEIN OF HIGH CONCENTRATION

Hans Wagner, Frankfort-on-the-Main, Germany, assignor, by mesne assignments, to Chemical Marketing Company Inc., New York, N. Y.

No Drawing. Application August 29, 1939, Serial No. 292,405. In Germany September 20, 1938

7 Claims. (Cl. 260—601)

The present invention relates to a process for the production of acrolein of high concentration or purity.

In the production of acrolein, a raw product usually is obtained which contains impurities of diverse characters which cannot be completely removed by a simple fractionation. This difficulty has been encountered in purifying the acrolein produced in accordance with the processes disclosed in the copending U. S. applications Serial No. 197,374 filed March 22, 1938 and Serial No. 272,852 filed May 10, 1939.

I have discovered that the impure acrolein produced, for example, in accordance with the processes of the aforesaid applications may be purified and an acrolein of high concentration or high purity obtained therefrom in a very simple and efficient manner.

It is an object of the present invention to provide a means for producing acrolein of high concentration or purity from impure acrolein.

It is another object of the present invention to provide a process for the production of acrolein of high concentration or purity from mixtures containing acrolein and impurities having both hydrophilic as well as hydrophobic constituents.

It is a further object of the present invention to provide a process for the production of acrolein of high concentration or purity involving distillation of impure acrolein in the presence of relatively large amounts of water.

The present invention also contemplates the recovery of acrolein of high concentration or purity from mixtures of acrolein with impurities having a wide range of boiling points by rectifying the aforesaid mixtures in the presence of water.

Other objects and advantages of the present invention will become apparent from the following description.

Generally speaking, the art has practiced processes for decomposing mixtures having a hydrophobic character by distilling the vapors therefrom with the addition of water. The art has also found it possible to decompose mixtures having a hydrophilic character by distilling the vapors therefrom with the addition of water. Nevertheless it has never been suggested that mixtures exhibiting simultaneously both hydrophobic and hydrophilic characteristics could be decomposed by distilling the vapors therefrom with the addition of water. Therefore it was astonishing to discover that impure solutions of acrolein containing simultaneously constituents characterized by hydrophilic as well as hydrophobic properties could be purified and acrolein of high concentration or purity produced therefrom. In addition the problem of producing acrolein of high concentration or purity from impure mixtures containing acrolein having the aforesaid hydrophilic and hydrophobic characteristics was complicated by a further characteristic of these impure, low concentration mixtures containing acrolein. Not only do these mixtures exhibit both hydrophilic and hydrophobic characters, but in addition the impurities have a very wide range of boiling points. Consequently it has not been considered practical heretofore to carry out the rectification of impure mixtures of acrolein in this manner. In addition, as is well known to those skilled in the art, acrolein has a very great tendency to polymerize and to condense. This proclivity for polymerizing and condensing seemed to preclude the possibility that a product of high purity and high concentration could be obtained by employing a process involving distillation. Nevertheless, in spite of the various theoretical considerations, it is possible to prepare acrolein having a purity of about 99% in accordance with the principles of the present invention.

In order that those skilled in the art may have a better understanding of the principles of the present invention, the following description of a process for producing acrolein of high purity or concentration employing the principles of the present invention is described hereinafter.

Acrolein produced in accordance with the process disclosed in the copending applications Serial No. 197,374 and Serial No. 272,852, or made by other suitable means, is distilled in the presence of about 3 to about 4 parts of water to 1 part of raw acrolein mixture. Thus the vapors of raw acrolein are passed through a condensation vessel wherein the major portion of the unchanged formaldehyde is separated, and are directly introduced into the lower portion of a column filled, or at least partially filled, with filling material such as Raschig rings and the like. At the upper portion of the column water at a temperature of about 40° C. is introduced in such a manner that 3 to 4 parts of water are introduced for 1 part of raw acrolein. The vapors escaping from the upper portion of the column are condensed and subsequently dried with calcium chloride or similar dehydrating agents. The acrolein produced in this manner has a purity of about 100%.

On the other hand, impure mixtures of acrolein with substances having hydrophilic and hydrophobic characteristics and having a wide range of boiling points may be purified to produce acrolein of high purity by rectifying a mixture of acrolein and water in a column having good dephlegmation.

Another embodiment of the principles of the present invention giving quite satisfactory results involves washing the vapors evolved by heating or distilling acrolein with water in a column and preferably in counter-current flow. It is particularly advantageous to preheat the water above a temperature at which undesirable precipitations or condensations occur during the washing process. For this purpose the wash water may be heated to temperatures of about 70° C. to about 100° C.

As those skilled in the art will readily understand, many types of washers are suitable for this purpose. Thus, the acrolein-containing vapors may be washed in stage washers, in Träger columns and in washing columns of various construction, such as those containing filling materials and so constructed as to permit a maximum contact of the wash water with the impure vapors. The quantity of wash water employed may be adjusted at will provided the minimum necessary to obtain the desired washing effect is employed. The wash water added during the distillation collects the detrimental impurities and brings them to the lower portion of the washing column, from whence the liquid containing only a small amount of acrolein may be withdrawn after the removal of the acrolein. The process may be carried out intermittently or continuously, at subatmospheric, atmospheric or superatmospheric pressure.

Although the present invention has been described in conjunction with certain preferred embodiments, it is to be understood that variations and modifications may be made, as those skilled in the art will readily understand. Such variations and modifications are to be considered within the purview of the present specification and the scope of the appended claims.

I claim:

1. A process for purifying acrolein which comprises passing the vapors produced by heating an impure mixture containing acrolein in counter-current with sufficient water to collect the aforesaid impurities whereby acrolein of high purity is obtained.

2. A process for purifying acrolein which comprises passing vapors produced by heating impure mixtures of acrolein obtained by condensing formaldehyde and acetaldehyde in countercurrent with water at a temperature at least above that at which undesirable precipitations or condensations occur, said water being in sufficient quantity to remove substantially all of said impurities whereby acrolein of high purity is obtained.

3. A process for purifying acrolein which comprises passing the vapors produced by heating an impure mixture obtained by condensing formaldehyde and acetaldehyde and containing acrolein in counter-current with sufficient water to collect the aforesaid impurities whereby acrolein of high purity is obtained.

4. A process for purifying acrolein which comprises passing a mixture containing acrolein, unreacted formaldehyde and other impurities through a condensation vessel to remove a major portion of said unreacted formaldehyde and produce a residual gas mixture, passing said residual gas mixture in countercurrent to wash water, said wash water being present in an amount equivalent to about 3 to about 4 parts of water for 1 part of residual gas mixture, maintaining the temperature of said wash water at higher than about 40° C., separating uncondensed vapors from said wash water, condensing said vapors to form a condensate and drying said condensate with a dehydrating agent whereby acrolein of high purity is obtained.

5. A process for purifying acrolein which comprises passing a mixture containing acrolein, unreacted formaldehyde and other impurities, obtained by condensing formaldehyde and acetaldehyde through a condensation vessel to remove a major portion of said unreacted formaldehyde and produce a residual gas mixture, passing said residual gas mixture in countercurrent to wash water, said wash water being present in an amount equivalent to about 3 to about 4 parts of water for 1 part of residual gas mixture, maintaining the temperature of said wash water at about 40° C., separating uncondensed vapors from said wash water condensing said vapors to form a condensate and drying said condensate with calcium chloride whereby acrolein of high purity is obtained.

6. A process for purifying acrolein which comprises passing vapors produced by heating mixtures obtained by the condensation of formaldehyde and acetaldehyde and containing acrolein and constituents having high hydrophobic and hydrophilic characteristics in countercurrent with sufficient wash water at a temperature of about 40 to about 100° C. to remove the aforesaid constituents whereby acrolein of high purity is obtained.

7. In the process of purifying acrolein in raw mixtures obtained by condensing formaldehyde and acetaldehyde, the improvement which comprises distilling acrolein with the addition of sufficient water to cause vapors at the boiling point of acrolein to be evolved, and washing the vapors developed during the distillation with water in countercurrent flow whereby acrolein of high purity is obtained.

HANS WAGNER.